United States Patent
Pluvinage et al.

(10) Patent No.: US 10,376,821 B2
(45) Date of Patent: Aug. 13, 2019

(54) FILTERING UNIT FOR A FILTERING CHIP CONVEYOR

(71) Applicant: LNS Management SA, Orvin (CH)

(72) Inventors: Loic Pluvinage, Brugg bei Biel (CH); Carlo Colombo, Biel / Bienne (CH)

(73) Assignee: LNS MANAGEMENT SARL, Orvin (CH)

( * ) Notice: Subject to any disclaimer, the term of this patent is extended or adjusted under 35 U.S.C. 154(b) by 388 days.

(21) Appl. No.: 14/851,023

(22) Filed: Sep. 11, 2015

(65) Prior Publication Data

US 2016/0263500 A1 Sep. 15, 2016

(30) Foreign Application Priority Data

Mar. 12, 2015 (CH) .......................... 341/15

(51) Int. Cl.
| | | |
|---|---|---|
| *B01D 33/01* | (2006.01) | |
| *B23Q 11/00* | (2006.01) | |
| *B01D 33/46* | (2006.01) | |
| *B01D 29/64* | (2006.01) | |

(Continued)

(52) U.S. Cl.
CPC ......... *B01D 33/0183* (2013.01); *B01D 29/33* (2013.01); *B01D 29/6407* (2013.01); *B01D 33/461* (2013.01); *B23Q 11/0042* (2013.01); *B01D 29/01* (2013.01); *B23Q 11/0067* (2013.01); *Y02P 70/171* (2015.11)

(58) Field of Classification Search
CPC .... B01D 29/19; B01D 29/01; B01D 33/0183; B01D 29/6407; B01D 29/33; B01D 29/0075; B01D 29/0077; B01D 33/461; B23Q 11/0042; B23Q 11/0067; Y02P 70/171

See application file for complete search history.

(56) References Cited

U.S. PATENT DOCUMENTS

| | | | | |
|---|---|---|---|---|
| 3,464,557 A | * | 9/1969 | Fowler ................. | B01D 29/096 210/251 |
| 3,554,379 A | * | 1/1971 | Pye ....................... | B01D 63/022 210/321.8 |

(Continued)

FOREIGN PATENT DOCUMENTS

| | | | |
|---|---|---|---|
| WO | WO-2004054756 A1 * | 7/2004 | ............ B01D 29/01 |
| WO | 2014177199 A1 | 11/2014 | |

OTHER PUBLICATIONS

European Patent Office, European Search Report issued in corresponding European Application No. EP 16159920 dated Aug. 8, 2016 (3 pages).

*Primary Examiner* — David C Mellon
*Assistant Examiner* — Liam Royce
(74) *Attorney, Agent, or Firm* — Pearne & Gordon LLP

(57) ABSTRACT

A filter unit, or more specifically, a filter box for a chip conveyor for conveying cutting chips that are produced in the operation of a machine tool, such as a lathe or the like. More specifically, the exemplary filter unit has at least one internally located brush that is used for removing different types of chips contained in a coolant fluid and/or cutting oil used in machine tools during metal working through mechanical brushing and jolting the surface of the filtration element(s) of the filter unit. A chip conveyor and a method of filtering cutting fluid in a filtering chip conveyor is also disclosed.

14 Claims, 4 Drawing Sheets

(51) Int. Cl.
*B01D 29/33* (2006.01)
*B01D 29/01* (2006.01)

(56) References Cited

U.S. PATENT DOCUMENTS

| | | | | |
|---|---|---|---|---|
| 3,850,802 | A | * 11/1974 | Berger | B01D 29/118 |
| | | | | 210/106 |
| 2014/0042078 | A1 | * 2/2014 | Hwang | B01D 29/0077 |
| | | | | 210/413 |
| 2014/0054244 | A1 | * 2/2014 | Towers | B01D 33/333 |
| | | | | 210/767 |

* cited by examiner

FIG. 3
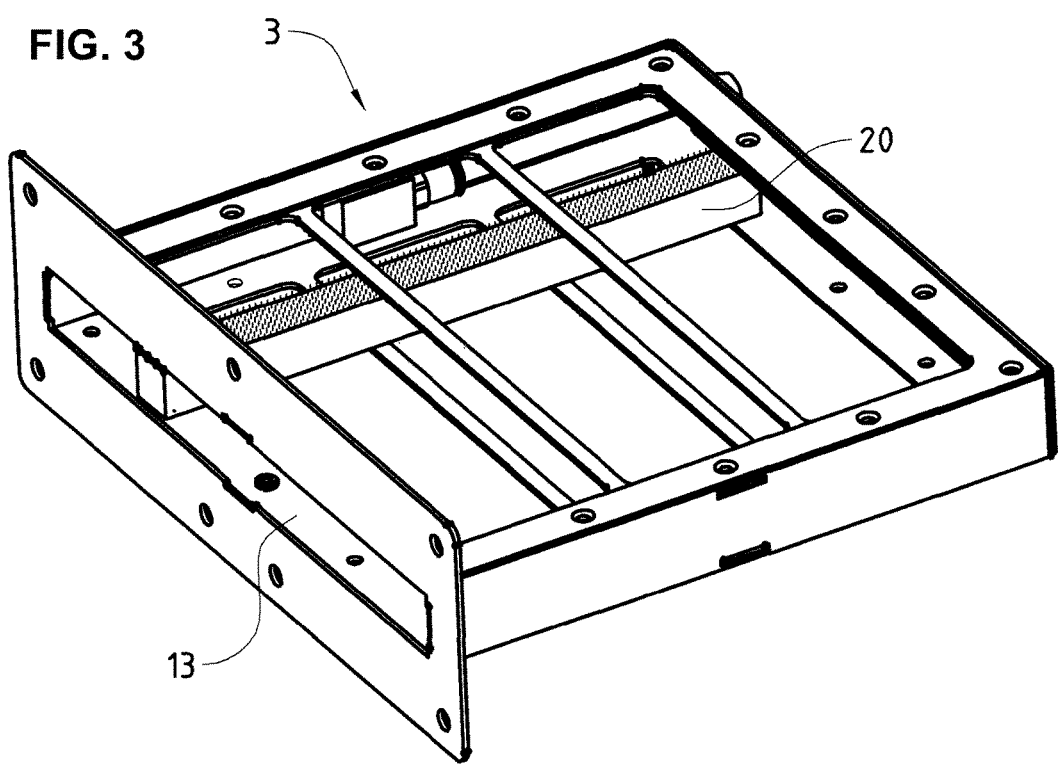
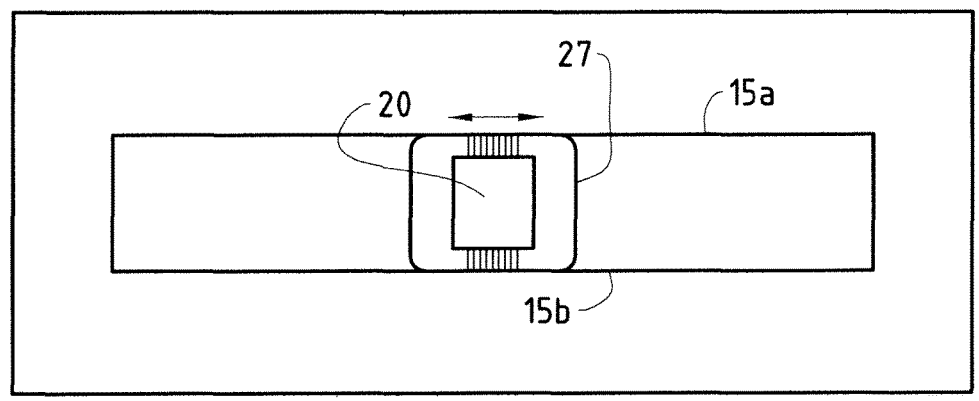
FIG. 4a

FILTERING UNIT FOR A FILTERING CHIP CONVEYOR

TECHNICAL FIELD

The present invention relates to a filter unit or more specifically a filter box for a chip conveyor for conveying cutting chips that are produced in the operation of a machine tool, such as a lathe or the like. More specifically, the proposed filter unit has at least one internally located brush that is used for removing different types of chips contained in a coolant fluid and/or cutting oil used in machine tools during metal working through mechanical brushing and jolting the surface of the filtration element(s) of the filter unit. The invention equally relates to a corresponding chip conveyor and to a method of filtering cutting fluid in a filtering chip conveyor using the present invention.

BACKGROUND OF THE INVENTION

In normal operation, a machine tool, such as a lathe, produces waste material that should be removed from the workpiece being machined. In these cases, the waste material that is removed from the workpiece is generally removed in various sizes including small pieces that are generally referred to as chips. These chips mix with the coolant/cutting oil (hereinafter referred to as cutting fluid) used in the machining process. The cutting fluid can be used for cooling, wash down and/or lubrication, for example. This mixture of cutting fluid and cutting chips enters the conveyor used for removing the chips from the cutting fluid. The cutting chips are thus conveyed from the receiving position to a discharge position.

The cutting fluid drains through the conveyor to the machine tool oil/coolant reservoir. Some of the chips that are mixed with the cutting fluid also pass into the machine's oil/coolant reservoir with the cutting fluid. These chips eventually build up in the machine oil/coolant reservoir and require manual intervention to clean them out, because the cutting fluid in the reservoir is generally re-circulated for further use. Thus, before the cutting fluid can be recirculated and reused, the waste material produced during the operation of the machine tool first has to be removed.

Hinge belt conveyors are widely used to convey the chips away from the cutting fluid. This type of conveyor is the most simple of all conveyors on the market, and is widely used throughout the industry. This is a very versatile product in that it is capable of taking any chip shape or size, but has generally one major drawback in that it often does not offer any filtration. This results in small chips passing through the conveyor into the cutting fluid tank which then means that the machine operator has to perform regular maintenance to clean out the tank (duration depending on the specific application).

However, filtering chip conveyors also exist and self-cleaning scraper conveyors are an example of these kinds of conveyors. They can filter out particles (chips) down to a particle size of around 500 µm (0.5 mm). The minimum dimension of the particles which can be filtered out of the fluid is also referred to as the filtration level. These kinds of conveyors, such as the one disclosed in WO2004/054756, typically use a self-cleaning filter box to prevent small chips (larger than the filtration level of the filter screens used) from passing out of the cutting fluid tank and being cycled back into the machine tool. One problem with such self-cleaning scraper conveyors is that they do not generally filter long chips well, especially long chips having a smallest dimension (thickness) similar to the size of the openings in the filter material. Chips are liable to become wedged in the weave of typical woven filtration meshes, and are difficult for the scrapers to dislodge. The mesh becomes clogged, and the fluid flow through the screen, and thereby the filtration performance, is markedly reduced. This is one of the reasons why self-cleaning scraper conveyors are commonly supplemented with a filter drum. This combination is better suited to applications in which a wide variety of various chip sizes and shapes are produced and in which filtration is needed.

Machines today are capable of many types of machining processes and thus produce a wide range of chip types and shapes. The currently available solutions are either inefficient (with no or poor filtration) or very expensive, due to the complexity of the drum filter and self-cleaning scraper conveyor arrangements required.

It is the aim of the present invention to overcome the problems identified above. More specifically, the aim is to provide a solution for filtering chip conveyors so that a high fluid through-flow can be obtained, while at the same time allowing filtration levels down to 50 µm or even lower.

SUMMARY OF THE INVENTION

According to a first aspect of the invention, there is provided a filter unit for a filtering chip conveyor, the filter unit comprising:
  at least one filtration element comprising a filtration region having a plurality of first openings for permitting cutting fluid to pass through the filtration element while not permitting chips with given dimensions to pass through it; and
  at least one second opening allowing cutting fluid inside the filter unit to pass out of the filter unit through the second opening, wherein the filter unit further comprises:
  at least one brush located inside of the filter unit, the brush being arranged to brush the filtration element to remove cutting chips from clogging the filtration element.

The proposed filter unit has the advantage that the solution is simple, while still allowing efficient cleaning of the filter unit. More specifically, chips that are usually stuck at the surface of the filtration element can now be mechanically brushed off from the filter element. Moreover, the brush which is considered as an internal cleaning mechanism also provides for a jolt effect when the brush motion is rapid. This means that the filter element is jolted due to the fast-moving and/or the fast rotating motion of the brush element. Thus, the filter unit can be considered as being self-cleaning. This also means that the fluid through-flow can be constantly high. Also filtration of chips with very small dimensions can be achieved. For instance, the filtering element can have openings with dimensions smaller than 50 µm.

The proposed filter unit can also be easily connected to a filtering chip conveyor, which is designed to be a simple filtration conveyor that can handle a multiple range of applications, material and chip types. Furthermore, spray bars are not necessarily needed to clean the filter unit but could be used additionally in enhancing the performance of the conveyor as the brush mechanism proposed herein proves to be superior than spray bars in removing cutting chips from filtration elements.

According to a second aspect of the invention, there is provided a filtering chip conveyor comprising the filter unit according to the first aspect of the present invention.

According to a third aspect of the invention, there is provided a method of filtering cutting fluid for a filtering chip conveyor comprising a conveyor tank arranged to retain the cutting fluid containing chips, and further comprising a continuous conveyor belt at least partly disposed inside the conveyor tank, the conveyor belt having upper and lower flights with a filter unit between these flights, wherein the filter unit comprises at least one of a filtration element and a brush, the method comprising:

the filter unit filtering the cutting fluid entering the filter unit;

the brush brushes the filtration element to remove cutting chips from clogging the filtration element, discharging the filtered cutting fluid off the conveyor through the filter unit, discharging the filtered cutting chips through the continuous conveyor belt.

In one embodiment according to the present invention, the filter unit is a filter box. Such filter box has an advantage of being compactedly built and better fitted into the filtering chip conveyor.

According to other embodiments of the present invention, the brush 20 is arranged to move from side to side within the filter unit. This enables almost the entire region of the filtration element 15 to be cleaned. Furthermore, the brush 20 is arranged to rotate and perform a translational motion, such as in a clockwise or an anti-clockwise direction. This allows another mechanical forces to be used to clean the filtration element 15 more efficient. Moreover, different cleaning directions allow for a more efficient cleaning mechanism. Also, the brush is arranged to rotate at a constant speed, but an inconsistent speed can also be used. The speed is important to be adjustable and to be fine-tuned depending on the requirement to remove cutting chips from clogging the filtration element 15. The brush 20 can be made up of at least one of a synthetic polymer, a metal and/or combination thereof. Furthermore, the brush is a quick connection coupling or a fixed connection. The quick connection of the brush 20 coupling to the moving part 27 allows for the brush to be changed, while the fixed connection of the brush 20 allows for an easier construction of the filter box 3. One or more brush 20 can be mounted in the filter box 3, depending on the width of the conveyor and the particular needs and applications. In some embodiments, the filtration element 15 is a filter mesh.

BRIEF DESCRIPTION OF THE DRAWINGS

Other features and advantages of the invention will become apparent from the following description of non-limiting exemplary embodiments, with reference to the appended drawings, in which:

FIG. 3 is a perspective view of a filter unit of FIG. 2b with the filtration element removed, thereby showing a brush located within the filter unit;

FIGS. 4a-d are cross sectional side views of the filter unit showing different examples of the brush cleaning mechanisms according to various embodiments of the present invention.

DETAILED DESCRIPTION OF THE PRESENT INVENTION

Next, an embodiment of the present invention is described in more detail with reference to the attached figures.

Figure 1:
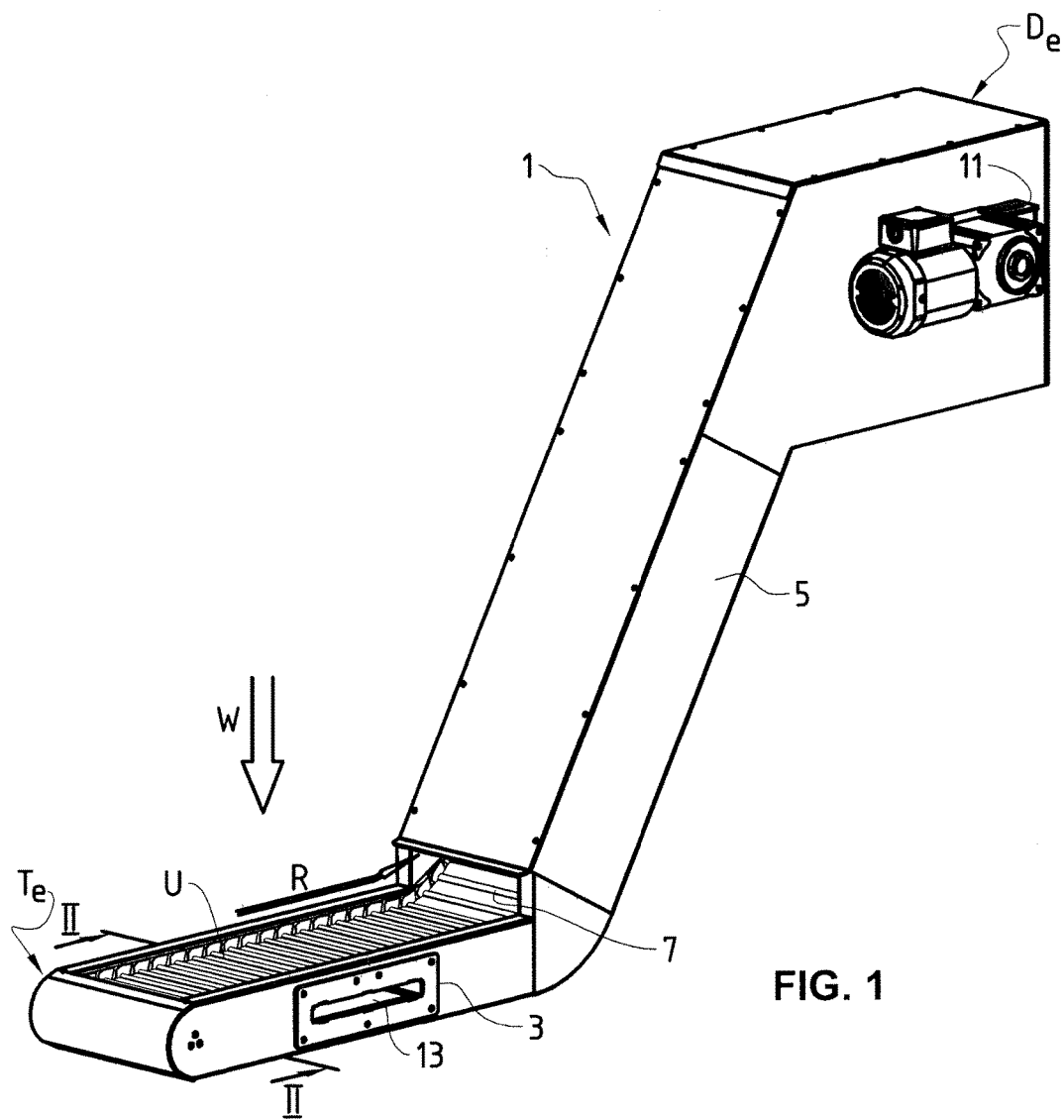
FIG. 1 is a perspective view of the filtering chip conveyor according to an embodiment of the present invention.

FIG. 1 is a perspective view showing the filtering chip conveyor 1 comprising the filter unit, in this example a filter box 3, according to one embodiment of the present invention. The conveyor 1 also comprises a conveyor tank which may have a conveyor frame 5, where the conveyor tank is arranged to retain the dirty cutting fluid resulting from metal working. A conveyor belt 7, in this case, a hinge belt, is at least partly disposed inside the conveyor frame 5. The hinge belt 7 is formed by connecting a plurality of metal plates with hinges into a continuous or endless caterpillar-type belt. The chips resulting from the metal working are arranged to fall inside the conveyor tank from above, in the direction of the arrow (W).

The hinge belt 7 is arranged to be turned around at tail-end sprocket/disk and discharge end sprockets and rotated as a belt conveyor. In the figures the tail end is referred to by "Te" and the discharge end by "De". A motor 11 is also shown and is used for rotating the belt 7.

Figure 2:
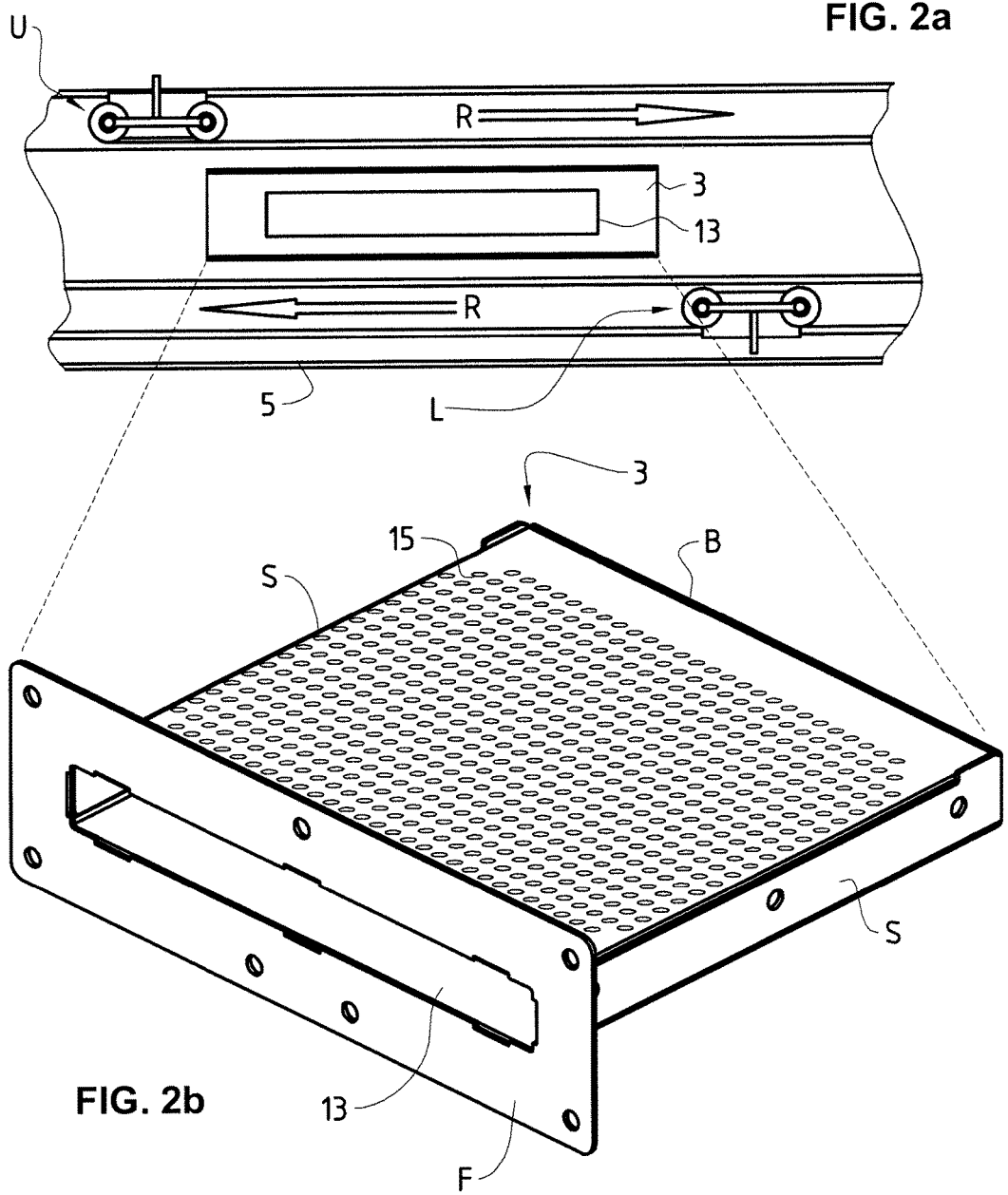
FIG. 2a is a side view of the filtering chip conveyor of FIG. 1.
FIG. 2b is a perspective view of a filter unit used for filtering cutting chips in accordance with an embodiment of the present invention.

The path of travel of the belt is substantially horizontal in the lower part of the conveyor 1, as can be seen in the FIG. 2a. As can be seen in FIG. 2a, the belt has an upper (reference "U" shown in FIG. 2a) and a lower (reference "L" shown in FIG. 2a) portion substantially parallel to one another in the lower part of the conveyor 1. The upper portion travels in a first direction, whereas the lower portion travels in a second direction, the second direction being opposite to the first direction, in the lower portion of the conveyor 1. The arrow R in FIG. 2a shows the direction of rotation of the belt 7. The upper portion is arranged to carry the large chips to the discharge end De to be discharged off the belt 7. A chip reservoir (not shown in the figure) is used to store the discharged chips.

In FIG. 2a, there is also shown the filter box 3 on the inside of the belt, i.e. between the upper U and lower L portions of the belt 7 for filtering the cutting fluid. By placing the filter box 3 on the inside of the belt 7 the filter box 3 is protected from large chips. There can be one or more boxes linked in the same conveyor depending e.g. on the flow rate required, the amount of cutting fluid used and frequency of cleaning. For instance, if a considerable amount of cutting fluid is needed, then the number and/or size of the orifices of the filter boxes 3 should be increased. The box(es) could be anywhere in the horizontal load section. As illustrated by the figure, the filter unit 3 has an opening 13 at the front (F) on the vertical side wall through which the filtered cutting fluid can be drained to a clean cutting fluid reservoir (not shown). From the clean cutting fluid reservoir the filtered cutting fluid can be pumped to the machine tool for reuse.

FIG. 2b is an exemplary perspective illustration of one possible filter box 3. When in operational position, the filter box 3 has in this example four substantially vertical sides and two substantially horizontal ends, i.e. the bottom part and the top part. One of the side walls is a front panel (F) and the back panel (B) is located at the opposite end as shown in FIG. 2b, and the front panel (F) has an opening 13 so that the filtered cutting fluid can be drained through this opening 13 to the clean cutting fluid container. Two side walls (S) of the filter box 3 are located to the left and right of the front panel (F). The filter box could also incorporate more than one of this type of opening 13. The box can also incorporate round ends/sloped faces, depending on specific applications.

In this example, the bottom part has a filtering or filtration element 15, such as a screen (i.e. filter plate screen) or mesh that is arranged to filter the dirty cutting fluid. The filtration element 15 is advantageously made of one of a variety of materials, including metals, glass or plastics. The other sides of the box 3 are metal, plastic or glass walls that do not allow the cutting fluid to penetrate into the box 3 through these walls. It is to be noted that the number of sides being fitted with the filtration element 15 is not limited to one. Also, instead of the bottom side being fitted with the filtration element 15, any other side could be equally fitted with the filtration element 15. The filter plate can be welded in or bolted in.

FIG. 3 shows the filter box 3 of FIG. 2b with the filtration element 15 being removed, hence revealing the internal part of the filter box 3. A brush 20 is located internal of the filter unit 3 in order to self clean the filtration element 15 from the inside out. The brushing mechanism showed in this example has a brush 20 that is elongated that is fixed to a moving part 27 (shown in FIGS. 4a-c). This advantageously allows the brush 20 to move from side (S) to side (S) within the filter unit so that almost the entire region of the filtration element 15 can be cleaned with one or more brush 20. According to one variant of the present invention, at least 95% of the surface of the filtration element 15 can be cleaned effectively by the brush element 20. The cleaning brush 20 can be in any shape such as flat, round, square or have any size and diameter. It is also to be understood that one or more of a wiper, a scraper or a blade can also be used as a brush replacement whereby they produce equally good cleaning effects as well as hydraulic jolt effect similar as to the brush according to the present invention. A particular preferred brush has a flat rectangular shape. It is to be noted that the orientation of the brush can be configured in any direction, for instance the brush 20 can be configured to move from front panel (F) to back panel (B), with or without the ability of self rotating. The brush element 20 can be mounted in a single or a double configuration in the filter box 3. The brush direction is preferably configured parallel to the moving-belt. In a yet further embodiment of the present invention, the brush may located at any position, for instance inside or outside of the filter box.

EXAMPLES

FIGS. 4a-d show cross sectional front views of the filter box 3, wherein different examples of the brush cleaning mechanisms can be employed according to the present invention.

FIG. 4a shows a first example of the brush cleaning mechanism. In this example, the brush 20 has a large diameter so that the brush is capable of reaching both the top part 15a and bottom part 15b of the filtration element 15 with a single cleaning brush 20. The brush in this example is able to move from side (S) to side (S) of the filter box 3. Said brush 20 is also capable of rotating in full circle, clock-wise or anti-clockwise while moving from one side to another. This advantageously allows the cleaning mechanism using fewer brush to clean different filtration elements 15a, 15b simultaneously.

Figure 4B:
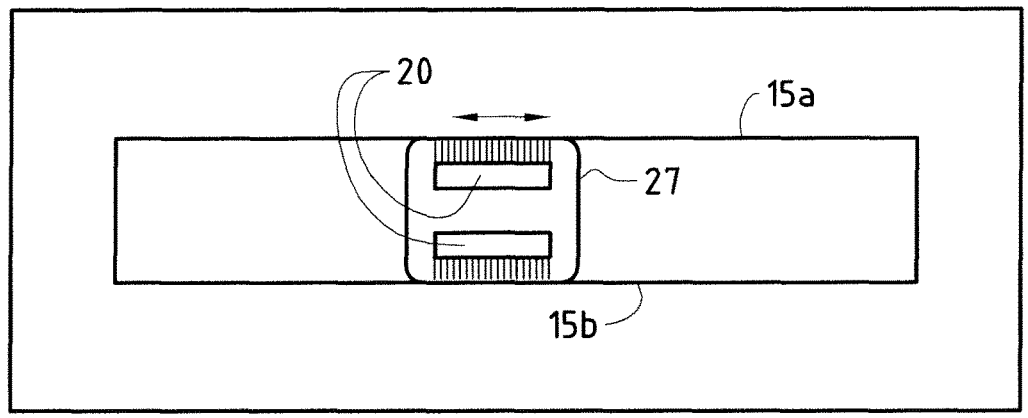

FIG. 4b shows another example where two brush elements 20 are mounted on a shared moving part 27. In this example, the brushes are mounted in a double configuration whereby one brush 20 is cleaning the top part 15a while another brush 20 is cleaning the bottom part 15b of the filtration element 15. As both the brushes are mounted on a shared moving part 27, the brush is configured to move simultaneously. Nevertheless, both brushes 20 are capable of rotating in different directions and speed, as discussed in all other examples. This example advantageously allows for a better and a more efficient cleaning mechanism to clean the filter box 3. The brushes 20 are mounted on the same moving part 27 and hence move simultaneously in the same direction, they could nonetheless rotate at different directions (clockwise and/or anti-clockwise) as well as speed. This allows for more versatile controls to the brush 20.

Figure 4C:
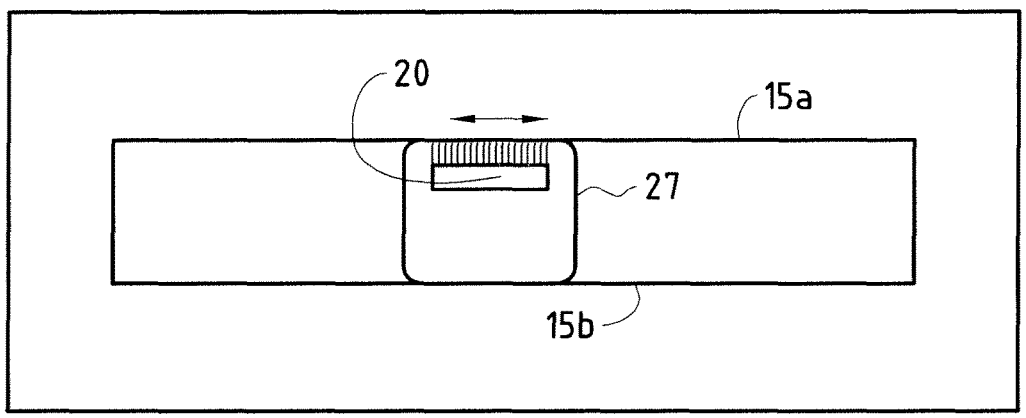

FIG. 4c shows a single brush 20 that is mounted on the moving part 27 within the filter box 3. In this example, the brush 20 is configured to brush the top part 15a of the filtration element 15. A single configuration of brush element is useful when there are less cutting chips to be removed from the filtration element 15. It is not only cost-saving, but also reduces the worn-out rate of the filtration element 15 caused by the mechanical scalping by the brush.

Figure 4D:
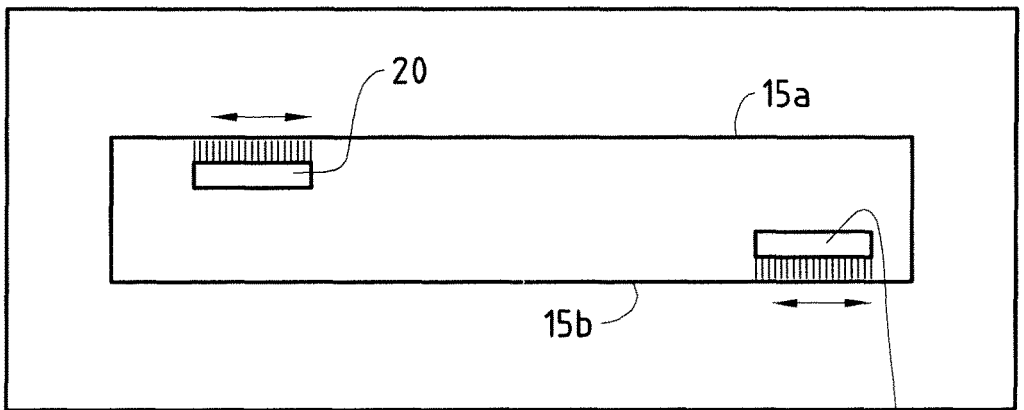

FIG. 4d shows yet another example of the brush cleaning mechanism according to one embodiment of the present invention. In this example, two brushes 20 are mounted on different moving parts 27, hence each brush 20 is controlled separately and hence could move in different directions. This example advantageously allows for the brush 20 to be adapted to the specific needs of cleaning the filtration element 15 of the filter box 3. For instance, a faster moving brush 20 may be required to clean the top part 15a of the filtration element 15a which may have more cutting chips to be removed while a slower moving brush 20 may be required to clean the bottom part 15b of the filtration element 15 where relatively fewer cutting chips stuck at the bottom filtration element, or vice versa.

In all examples described above, the brush 20 cleans the filtration element 15 with mechanical force also has a jolt effect as well as a back-flush effect when the brush motion is rapid. These effects additionally allow for a more efficient cleaning on the filtration element 15. Due to the delicate designed of the filtration element 15, the brush 20 used for cleaning the filter box 3 is specially designed in order to avoid damaging the filtration element 15 while efficient enough to remove the cutting chips from clogging the orifice openings of the filtration element 15. Moreover, the brush 20 according to the present invention uses a controllable mechanical force, such cleaning mechanism proves to be superior compared to other cleaning mechanisms alone such as liquid or gas spray system in removing cutting chips. The brush shown in this example, apart from moving from side to side to clean the filtration element 15, it could also rotate 360 degrees in different directions, for instance rotating in a clockwise direction, anti-clockwise direction or in an alternative direction. Furthermore, the rotation speed can be varied, depending on the needs of cleaning the filtration element 15. Therefore cutting chips can be removed from clogging the filtration element 15.

In a further embodiment, the filter box 3 may further equip with one or more cleaning mechanisms to assist the brush cleaning mechanism. For instance, the filter box 3 may have an additional internal flush or spray system to emit pressurised water or compressed air towards the filtration element 15 from inside out in order to remove the clogged cutting chips. The spray system has a spray bar or pipe, and an internal piping system (not shown) having distribution hoses connected to the spray pipe.

While the invention has been illustrated and described in detail in the drawings and foregoing description, such illustration and description are to be considered illustrative or exemplary and not restrictive, the invention being not restricted to the disclosed embodiment. Dual, triple or numerous filter element 15 in the same filter unit 3 could be used. Layered filtration to finer and finer levels could also be considered. The filter unit(s) can be removably connected or fixed to the tank 5. The filter unit 3 could consist of one large box. Furthermore, the filter element 15 could also form part of the tank of the conveyor 1. Moreover, the conveyor can also comprise second cleaning means, such as an external cleaning brush, on the inner side of the belt 7 to clean the filter unit 3 while the belt 7 rotates. Thus, the natural rotation of the belt 7 can be used for cleaning the filter unit 3. The brushes can be made of synthetic polymer such as nylon, polyester, polystyrene and may be placed in the middle of the flat metal part of the belt, i.e. the part between the hinges. It is also possible for the brushes to be made of other synthetic polymers, metals or combination thereof. Other variations of the disclosed embodiment can be understood and effected by those skilled in the art in practising the claimed invention, from a study of the drawings, the disclosure and the appended claims.

In the claims, the word "comprising" does not exclude other elements or steps, and the indefinite article "a" or "an" does not exclude a plurality. A single unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A filter unit for a filtering chip conveyor, the filter unit comprising:
   a plurality of walls collectively defining an interior space of the filter unit;
   at least one filtration element comprising a filtration region having a plurality of first openings extending through a first wall for permitting cutting fluid to pass through the filtration element while not permitting chips with given dimensions to pass through the filtration element, the first wall having an internal side facing the interior space;
   at least one second opening extending through a second wall for allowing cutting fluid within the interior space of the filter unit to pass out of the filter unit through the second opening; and
   at least one brush located within the interior space of the filter unit, the brush being arranged to brush the internal side of the first wall to remove cutting chips from clogging the filtration element, wherein the brush is arranged to move from side to side within the interior space of the filter unit.

2. The filter unit according to claim 1, wherein the brush is arranged to rotate and perform a translational motion.

3. The filter unit according to claim 2, wherein the brush is arranged to rotate at a constant or inconsistent speed.

4. The filter unit according to claim 1, wherein the brush is made of at least one of a synthetic polymer, a metal and/or combination thereof.

5. The filter unit according to claim 1, wherein the filtration element is a filter mesh.

6. A filtering chip conveyor comprising the filter unit according to claim 1.

7. The filtering chip conveyor according to claim 6 further comprising:
   a conveyor tank arranged to retain cutting fluid containing chips;
   a continuous conveyor belt at least partly disposed inside the conveyor tank, the belt being arranged to rotate and to turn at a tail end and at a discharge end, with a space between upper and lower flights of the belt, so as to transport chips on the upper flight towards the discharge end, to be discharged off the conveyor,
   wherein a filter box is arranged between the upper and the lower flights of the belt.

8. The filter unit according to claim 1, wherein the filter unit is a filter box.

9. The filter unit according to claim 1, wherein the plurality of walls includes four side walls and two end walls.

10. The filter unit according to claim 9, wherein the at least one filtration element at least partially defines at least one of the two end walls.

11. The filter unit according to claim 10, wherein the at least one second opening extends through at least one of the four side walls.

12. The filter unit according to claim 9, wherein the four side walls are configured to be vertical and the two end walls are configured to be horizontal during use.

13. The filter unit according to claim 1, wherein the at least one second opening is downstream of the plurality of first openings.

14. The filter unit according to claim 1, wherein the at least one brush is configured to move along at least one translation path in a first direction and to move along the at least one translation path in a second direction opposite the first direction.

* * * * *

UNITED STATES PATENT AND TRADEMARK OFFICE
CERTIFICATE OF CORRECTION

| | |
|---|---|
| PATENT NO. | : 10,376,821 B2 |
| APPLICATION NO. | : 14/851023 |
| DATED | : August 13, 2019 |
| INVENTOR(S) | : Loic Pluvinage and Carlo Colombo |

Page 1 of 1

It is certified that error appears in the above-identified patent and that said Letters Patent is hereby corrected as shown below:

On the Title Page

Please delete the paragraph under "ABSTRACT" and insert the following:
--A filter unit, or more specifically, a filter box for a filtering chip conveyor. The filter box comprises at least one filtration element comprising a filtration region having a plurality of first openings for permitting cutting fluid to pass through the filtration element while not permitting chips with given dimensions to pass through it; and at least one second opening allowing filtered cutting fluid inside the filter unit to pass out of the filter unit through the second opening. The filter unit further comprises at least one brush on the inside of the filter unit, wherein the brush is arranged to brush and jolt the filtration element to remove and clean at least a part of the filtration region.--.

In the Specification

In Column 1, please delete the paragraph under "TECHNICAL FIELD" and insert the following:
--A filter unit, or more specifically, a filter box for a chip conveyor for conveying cutting chips that are produced in the operation of a machine tool, such as a lathe or the like. More specifically, the exemplary filter unit has at least one internally located brush that is used for removing different types of chips contained in a coolant fluid and/or cutting oil used in machine tools during metal working through mechanical brushing and jolting the surface of the filtration element(s) of the filter unit. A corresponding chip conveyor and a method of filtering cutting fluid in a filtering chip conveyor is also disclosed.--.

In Column 4, Line 31, please insert a space between "7." and "A".

Signed and Sealed this
Thirty-first Day of December, 2019

Andrei Iancu
*Director of the United States Patent and Trademark Office*